United States Patent [19]

Nakamura

[11] Patent Number: 5,495,759
[45] Date of Patent: Mar. 5, 1996

[54] DETECTING CIRCUIT WHICH SUPPRESSES A DRIFT SIGNAL

[75] Inventor: Takeshi Nakamura, Nagaokakyo, Japan

[73] Assignee: Murata Manufacturing Co., Ltd., Kyoto, Japan

[21] Appl. No.: 277,643

[22] Filed: Jul. 20, 1994

[30] Foreign Application Priority Data

Jul. 22, 1993 [JP] Japan .................. 5-202590

[51] Int. Cl.⁶ ................................. G01P 9/04
[52] U.S. Cl. .............. 73/504.12; 310/316; 250/231.12
[58] Field of Search ............... 73/505, 497; 310/316, 310/315, 329; 250/231.12, 231.16

[56] References Cited

U.S. PATENT DOCUMENTS

| | | | |
|---|---|---|---|
| 5,111,083 | 5/1992 | Nakamura | 307/527 |
| 5,220,833 | 6/1993 | Nakamura | 73/505 |
| 5,270,607 | 12/1993 | Terajima | 73/505 |
| 5,375,336 | 12/1994 | Nakamura | 33/324 |
| 5,412,204 | 5/1995 | Nakamura | 73/505 |

FOREIGN PATENT DOCUMENTS 0477540  1/1992  European Pat. Off. .

Primary Examiner—Hezron E. Williams
Assistant Examiner—Helen C. Kwok
Attorney, Agent, or Firm—Nikaido, Marmelstein, Murray & Oram

[57] ABSTRACT

Between the piezoelectric elements (16a), (16b) for driving and detecting and the piezoelectric element (16c) for feedback of the vibratory gyroscope (12), the oscillation circuit (30) is connected. By the resistors (32), (36), (38), the capacitor (34), the electrostatic capacities of the piezoelectric elements (16a), (16b) and so on, a phase difference of 90 degree is formed between the output signal of the oscillation circuit (30) and the driving signals applied to the piezoelectric elements (16a), (16b). The piezoelectric elements (16a), (16b) are connected to the input terminals of the differential circuit (40). The output signal of the differential circuit (40) is synchronously detected by the FET (46). The output signal of the oscillation circuit (30) is used as the synchronizing signal for synchronously detecting. The detected signal is smoothed by the smoothing circuit (52).

3 Claims, 9 Drawing Sheets

DETECTING CIRCUIT WHICH SUPPRESSES A DRIFT SIGNAL

BACKGROUND OF THE INVENTION

1. Field of the Invention

The present invention relates to a detecting circuit, more particularly to a detecting circuit for measuring an output of, for example, a prism-shaped vibratory gyroscope used a bending vibration.

2. Description of the Prior Art

FIG. 14 is a block diagram showing an example of a conventional detecting circuit which is a background of the present invention. The detecting circuit 1 is used for detecting an output of, for example, a triangular prismshaped vibratory gyroscope 2. Between two piezoelectric elements 3 and the other piezoelectric element 4 of the vibratory gyroscope 2, an oscillation circuit 5 is connected. In this case, the oscillation circuit 5 is connected respectively to the two piezoelectric elements 3 of the vibratory gyroscope 2 via resistors 6. Outputs of the piezoelectric elements 3 are applied to a differential amplifier circuit 7. An output of the differential amplifier circuit 7 is converted into a DC output by a smoothing circuit 9 via a synchronous detection circuit 8.

By the oscillation circuit 5, the vibratory gyroscope 2 bends and vibrates in the direction perpendicular to the surface of the piezoelectric element 4. In this time, output signals from the two piezoelectric elements 3 are the same signal, an output from the differential amplifier circuit 7 becomes zero. When the vibratory gyroscope 2 is rotated about its axis, a Coriolis force is generated in the direction perpendicular to the vibrating direction of the vibratory gyroscope 2. The vibrating direction of the vibratory gyroscope 2 is shifted from the vibrating direction at non-rotation. A difference of outputs is generated between the two piezoelectric elements 3, an output is obtained from the differential amplifier circuit 7. The output becomes the value corresponding to the magnitude of the rotational angular velocity. The output is smoothed by the smoothing circuit 9 via the synchronous detection circuit 8, and an output of the smoothing circuit 9 is measured, thereby the rotational angular velocity applied to the vibratory gyroscope 2 can be measured.

However, the electrostatic capacities of the piezoelectric elements change by an atmospheric temperature, a change with time and so on, a drift signal is generated from the differential amplifier circuit even during non-rotation. The drift signal causes an error in measurement, it is impossible to measure an accurate rotational angular velocity.

SUMMARY OF THE INVENTION

Therefore, it is a primary object of the present invention to provide a detecting circuit capable of suppressing a drift signal generated by a change in an atmospheric temperature and a change with time and detecting an accurate rotational angular velocity.

The present invention is a detecting circuit for detecting an output of a vibratory gyroscope including a prism-shaped vibrating body and two driving and detecting members formed on a surface of the vibrating body used as both of driving for vibrating the vibrating body and detecting for obtaining an output corresponding to a rotational angular velocity comprising a differential circuit for detecting a difference between signals obtained from the two driving and detecting members, and a synchronous detection circuit for synchronously detecting an output signal of the differential circuit, wherein a phase difference between a driving signal applied to the driving and detecting members and a synchronizing signal applied to the synchronous detection circuit is 90 degree.

The detecting circuit may further have a summing circuit for detecting a sum of the signals obtained from the driving and detecting members, another synchronous detection circuit for detecting an output signal of the summing circuit in synchronous with the synchronizing signal, two smoothing circuits for smoothing output signals of the two synchronous detection circuits, and a composite circuit for composing output signals of the two smoothing circuits.

The detecting circuit may have a summing circuit for detecting a sum of the signals obtained from the driving and detecting members, and a composite circuit for composing the output signal of the differential circuit and an output signal of the summing circuit, the output signal of the differential circuit and the output signal of the summing circuit composed by the composite circuit may be detected by the synchronous detection circuit.

The detecting circuit may have a summing circuit for detecting a sum of the signals obtained from the driving and detecting members, and a variable resistor for applying an output signal of the summing circuit to two input terminals of the differential circuit, two fixed terminals of the variable resistor may be connected to the two input terminals of the differential circuit, and an output terminal of the summing circuit may be connected to a movable terminal of the variable resistor.

By shifting a phase difference between the driving signal of the vibratory gyroscope and the synchronizing signal of the synchronous detection circuit to 90 degree, a level component of the drift signal obtained from the differential circuit is offset by the synchronous detection circuit. A sum of the outputs of the driving and detecting members of the vibratory gyroscope is obtained by the summing circuit. By shifting the phase difference between the driving signal of the vibratory gyroscope and the synchronizing signal of the synchronous detection circuit to 90 degree, a level component of the drift signal obtained from the summing circuit is offset by the synchronous detection circuit, too.

When the phase components of the drift signals obtained from the differential circuit and the summing circuit are synchronously detected, the phase components obtained from these two circuits can be composed so as to offset each other. The output of the differential circuit and the output of the summing circuit are composed and synchronously detected, thereby the phase components of the drift signals can be offset. When the output signal of the summing circuit is applied to the input terminal of the differential circuit via the variable resistor, by adjusting the variable resistor corresponding to a polarity of the output of the differential circuit, the phase component of the drift signal is offset from the output signal of the differential circuit.

According to the present invention, a detecting circuit capable of eliminating a level component of a drift signal generated in the vibratory gyroscope can be obtained. A detecting circuit capable of eliminating a phase component of a drift signal can be obtained. An error in measurement caused by a drift signal generated by a change in an atmospheric temperature and a change with time can be decreased, and an accurate rotational angular velocity can be detected.

The above and other objects, features, aspects and advantages of the present invention will become more apparent from the following detailed description of the embodiments with reference to the accompanying drawings.

DESCRIPTION OF THE PREFERRED EMBODIMENTS

Figure 1:
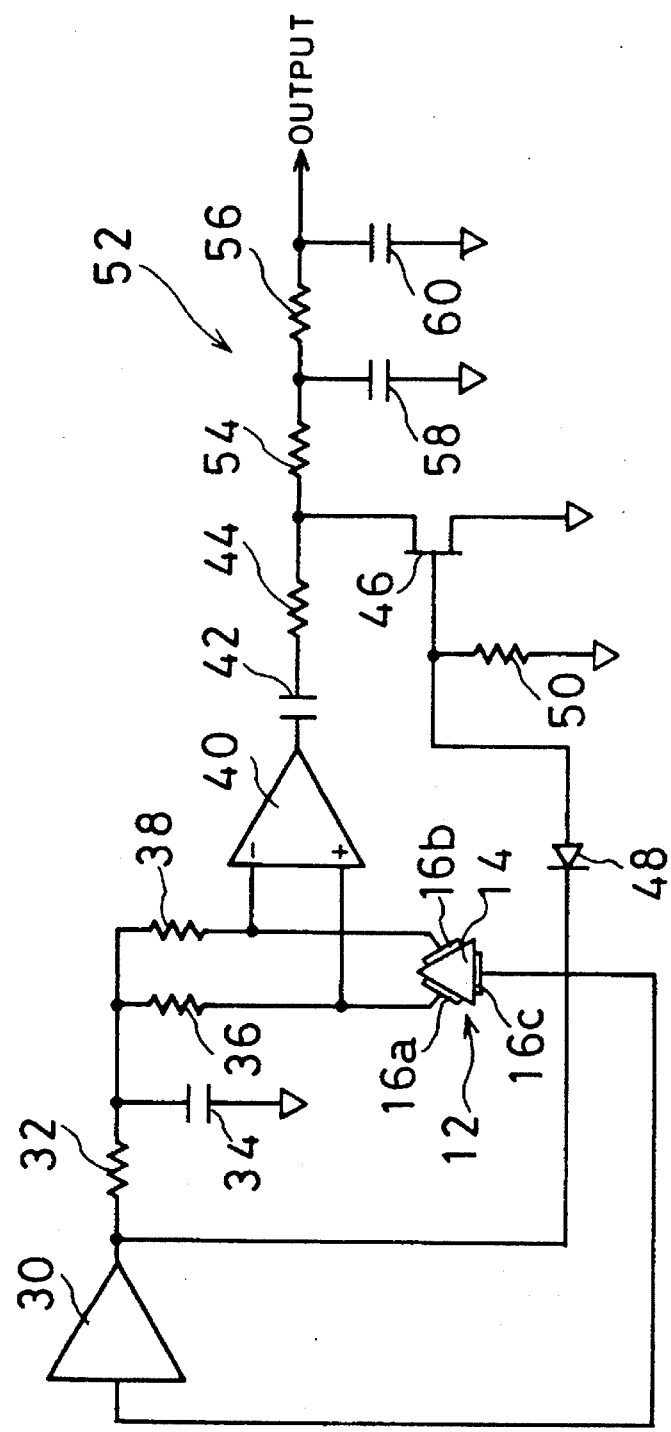
FIG. 1 is a circuit diagram showing one embodiment of the present invention.
Figure 2A:
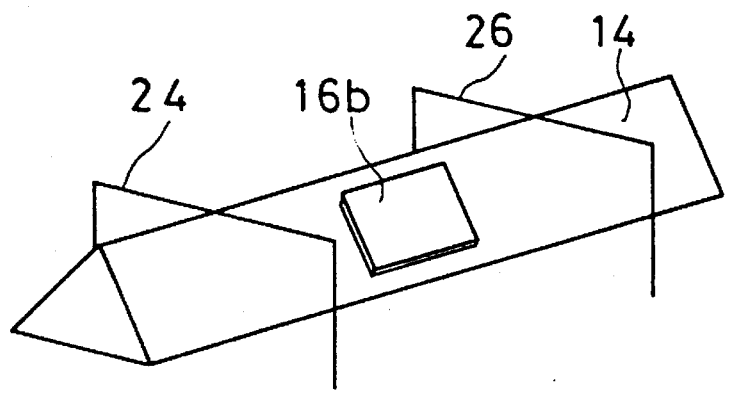
FIG. 2(A) is a perspective view of a vibratory gyroscope used in the detecting circuit shown in FIG. 1.
Figure 2B:
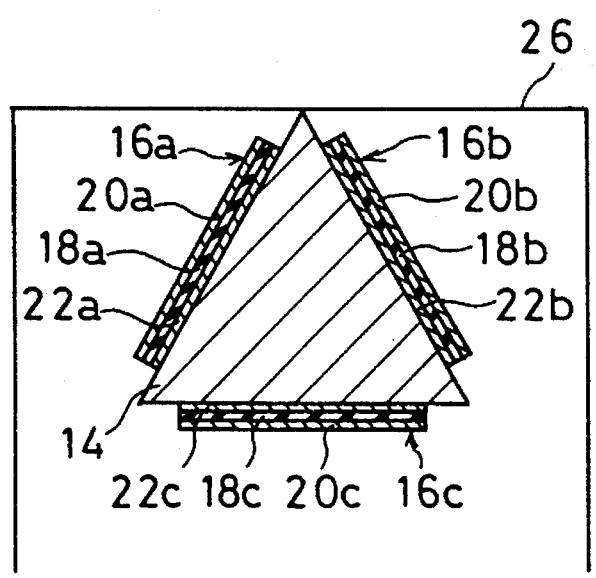
FIG. 2(B) is a sectional view thereof.

FIG. 1 is a circuit diagram showing one embodiment of the present invention. The detecting circuit 10 is used for detecting an output signal of a vibratory gyroscope 12. As shown in FIG. 2(A) and FIG. 2(B), the vibratory gyroscope 12 includes, for example, a regular triangular prism-shaped vibrating body 14. The vibrating body 14 is formed with a material which generally generates a mechanical vibration such as elinver, iron-nickel alloy, quartz, glass, crystal, ceramics and the like.

At the center portions of three side faces of the vibrating body 14, piezoelectric elements 16a, 16b and 16c are formed respectively. The piezoelectric element 16a includes a piezoelectric layer 18a consisting of, for example, ceramics, and on both surfaces of the piezoelectric layer 18a, electrodes 20a and 22a are formed respectively. The electrodes 20a and 22a are formed with an electrode material such as gold, silver, aluminum, nickel, copper-nickel alloy (Monel Metal) and the like, and by means of thin-film techniques such as sputtering and vacuum evaporation or by means of printing techniques depending on the material. Similarly, the other piezoelectric elements 16b and 16c respectively include piezoelectric layers 18b and 18c consisting of, for example, ceramics, and on both surfaces of the piezoelectric layers 18b and 18c, electrodes 20b, 22b, 20c and 22c are formed respectively. The electrodes 22a–22c of the one side of the piezoelectric elements 16a–16c are bonded to the vibrating body 14 by means of, for example, an conductive adhesive.

The vibrating body 14 is supported by supporting members 24 and 26 consisting of, for example, a metal wire at the vicinities of the nodal points thereof. The supporting members 24 and 26 are secured to the vicinities of the nodal points of the vibrating body 14 by, for example, welding.

The piezoelectric elements 16a and 16b of the vibratory gyroscope 12 are used as driving for bending and vibrating the vibrating body 14. The piezoelectric elements 16a and 16b are used as detecting for detecting a signal corresponding to a rotational angular velocity applied to the vibratory gyroscope 12. The other piezoelectric element 16c is used as feedback when bending and vibrating the vibrating body 14.

For driving the vibratory gyroscope 12, an oscillation circuit 30 is connected between the piezoelectric elements 16a and 16b for driving and the piezoelectric element 16c for feedback. One end of a resistor 32 is connected to the oscillation circuit 30, the other end of the resistor 32 is connected to an intermediate point of a power supply voltage via a capacitor 34. The other end of the resistor 32 is connected to the piezoelectric elements 16a and 16b via resistors 36 and 38. In this embodiment, by the resistor 32 and the capacitor 34, an output signal of the oscillation circuit 30 is shifted by 45 degree. By the resistor 36 and the electrostatic capacity of the piezoelectric element 16a, the signal is shifted by 45 degree. Similarly, by the resistor 38 and the electrostatic capacity of the piezoelectric element 16b, the signal is shifted by 45 degree. There is a phase difference of 90 degree between the output signal of the oscillation circuit 30 and driving signals applied to the piezoelectric elements 16a and 16b.

Signals obtained from the piezoelectric elements 16a and 16b are applied to input terminals of a differential circuit 40. A difference between the signals from the piezoelectric elements 16a and 16b is obtained from the differential circuit 40. An output terminal of the differential circuit 40 is connected to an FET 46 used as a synchronous detection circuit via a coupling capacitor 42 and a resistor 44. In this case, a source of the FET 46 is connected to the resistor 44, a drain thereof is connected to the intermediate point of the power supply voltage. A synchronizing signal is applied from the oscillation circuit 30 to a gate of the FET 46 via a diode 48. The gate of the FET 46 is connected to the intermediate point of the power supply voltage via a resistor 50. A signal detected by the FET 46 is applied to a smoothing circuit 52. The smoothing circuit 52 is formed with, for example, two resistors 54 and 56 and two capacitors 58 and 60.

By the signal from the oscillation circuit 30, the vibrating body 14 of the vibratory gyroscope 12 bends and vibrates in the direction perpendicular to the surface whereon the piezoelectric element 16c is formed. In this state, levels and phases of the driving signals applied to the piezoelectric elements 16a and 16b are the same, any driving signal is not obtained from the differential circuit 40. In this state, when the vibrating body 14 is rotated about its axis, the vibrating direction of the vibrating body 14 is changed by a Coriolis force. A difference is generated between outputs of the piezoelectric elements 16a and 16b, the difference between these signals is obtained from the differential circuit 40. The output signal of the differential circuit 40 is a value corresponding to the rotational angular velocity applied to the vibratory gyroscope 12. The output signal of the differential circuit 40 is synchronously detected and smoothed, thereby the rotational angular velocity can be detected.

However, by changing an atmospheric temperature and so on, there is a case that a difference is generated between electrostatic capacities of the piezoelectric elements 16a and 16b and a signal is obtained from the differential circuit 40 even non-rotation. In this way, by changing an atmospheric temperature and so on, even at if any rotational angular velocity is not applied, a signal is obtained from the differential circuit 40. When there is a drift signal, it is impossible to detect an accurate rotational angular velocity.

Figure 3:
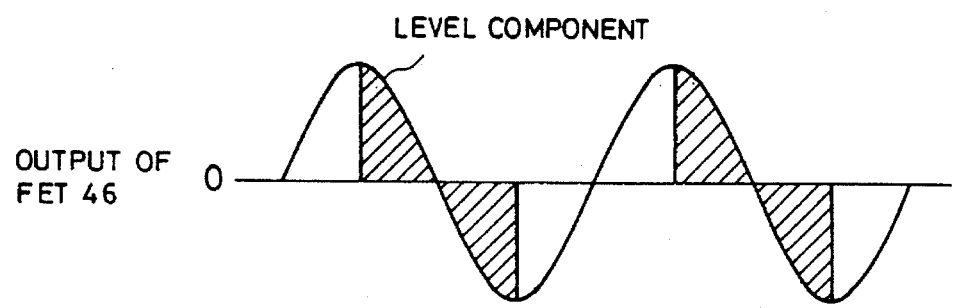
FIG. 3 is a wave form diagram showing an output signal of an FET as a synchronous detection circuit of the detecting circuit shown in FIG. 1.
Figure 4:
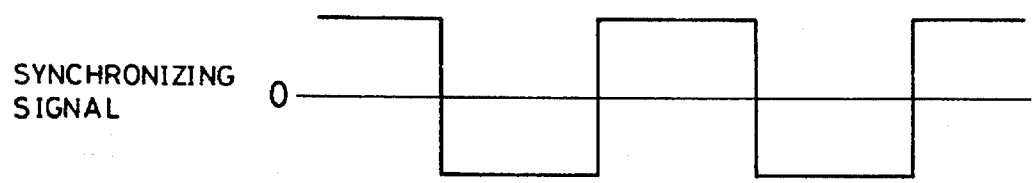
FIG. 4 is a wave form diagram showing a synchronizing signal applied to the FET of the detecting circuit shown in FIG. 1.

In the detecting circuit 10, when there is a difference between levels of the driving signals applied to the piezoelectric elements 16a and 16b, as shown in FIG. 3, the difference between the levels is obtained from the differential circuit 40. The output signal of the differential circuit 40 is synchronously detected by the FET 46. Since a synchronizing signal applied to the FET 46 has a phase difference of 90 degree from the driving signals applied to the piezoelectric elements 16a and 16b as shown in FIG. 4, the output signal of the differential circuit 40 is detected within a range of 180 degree around the zero point as a center. Since a positive portion and a negative portion of the signal detected by the FET 46 are the same magnitude, when the signal is smoothed by the smoothing circuit 52, the positive portion and the negative portion are offset. The output signal of the smoothing circuit 52 becomes zero. Meanwhile, when a rotational angular velocity is applied to the vibratory gyroscope 12, since signals having a phase difference of 90 degree from the driving signals are obtained from the piezoelectric elements 16a and 16b, a signal corresponding to the rotational angular velocity is not offset.

In this way, when the detecting circuit shown in FIG. 1 is used, a drift signal caused by a difference between levels of the driving signals can be eliminated. A rotational angular velocity applied to the vibratory gyroscope 10 can be detected accurately.

Figure 5:
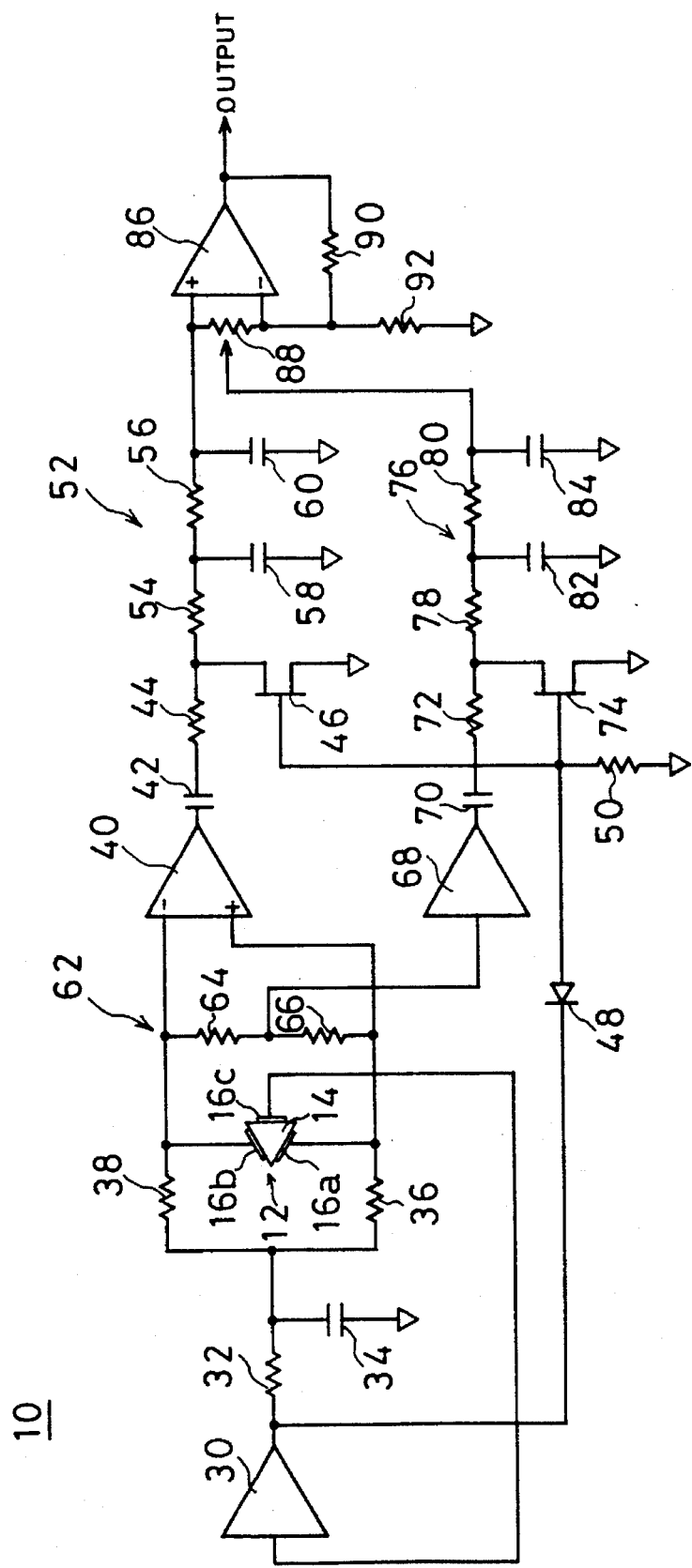
FIG. 5 is a circuit diagram showing another embodiment of the present invention.

However, in the detecting circuit shown in FIG. 1, when a phase difference is generated between the driving signals applied to the piezoelectric elements 16a and 16b, it is impossible to eliminate a phase component of a drift signal. A detecting circuit capable of eliminating a drift signal including a phase component is shown in FIG. 5. In the detecting circuit 10, a summing circuit 62 besides the differential circuit 40 is formed. In this embodiment, the summing circuit 62 is formed with two resistors 64 and 66 connected between the piezoelectric elements 16a and 16b. By taking a signal from an intermediate portion between the resistors 64 and 66, a sum of output signals of the piezoelectric elements 16a and 16b is detected.

The signal from the resistor 64 and 66 is applied to an amplifier 68. An output terminal of the amplifier 68 is connected to an FET 74 as a synchronous detection circuit via a coupling capacitor 70 and a resistor 72. To a gate of the FET 74, the output signal of the oscillation circuit 30 is applied as a synchronizing signal. The detected signal is applied to a smoothing circuit 76. The smoothing circuit 76 is formed with two resistors 78 and 80 and two capacitors 82 and 84.

An output terminal of the smoothing circuit 52 on the side of the differential circuit 40 is connected to a non-inversion input terminal of a DC amplifier 86. Fixed terminals of a variable resistor 88 are connected to two input terminals of the DC amplifier 86. An output terminal of the smoothing circuit 76 on the side of the summing circuit 62 is connected to a movable terminal of the variable resistor 88. A resistor 90 is connected between the inversion input terminal and the output terminal of the DC amplifier 86, further the inversion input terminal of the DC amplifier 86 is connected to the intermediate point of the power supply voltage via a resistor 92.

Figure 6:
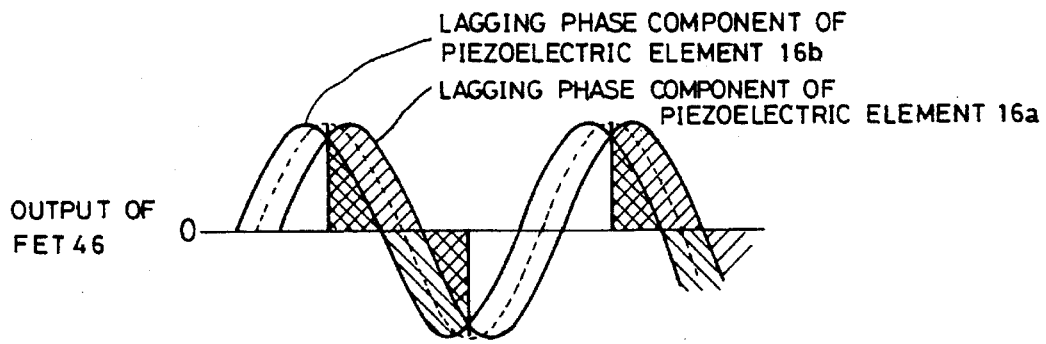
FIG. 6 is a wave form diagram showing an output signal of an FET connected to a differential circuit of the detecting circuit shown in FIG. 5.
Figure 7:
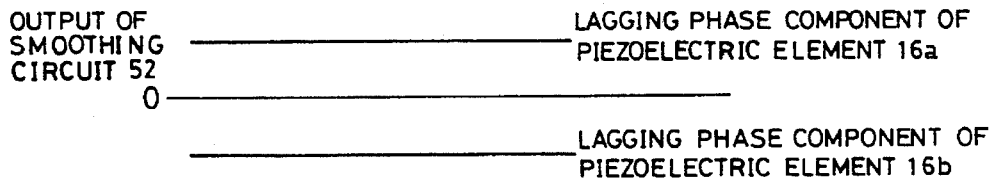
FIG. 7 is a wave form diagram smoothed the signal shown in FIG. 6.

In the detecting circuit 10, since there is a phase difference of 90 degree between the driving signals applied to the piezoelectric elements 16a and 16b and the output signal of the oscillation circuit 30, level components of drift signals are synchronously detected by the FET 46, thereby the level components are offset. A level component of a sum of the drift signals has the same phase of the level component of the difference of the drift signals, the level component of the sum is synchronously detected by the FET 74, thereby the level component is offset. When there is a phase difference between the drift signals obtained from the piezoelectric elements 16a and 16b, a signal corresponding to the phase difference is obtained from the differential circuit 40. In this case, as shown in FIG. 6, by a phase relation between the drift signals of the piezoelectric elements 16a and 16b, the signal of the difference leads or lags compared with a case not having a phase difference. When the output signal of the differential circuit 40 is synchronously detected and smoothed, as shown in FIG. 7, a lagging signal becomes a positive output signal, a leading signal becomes a negative output signal.

Figure 8:
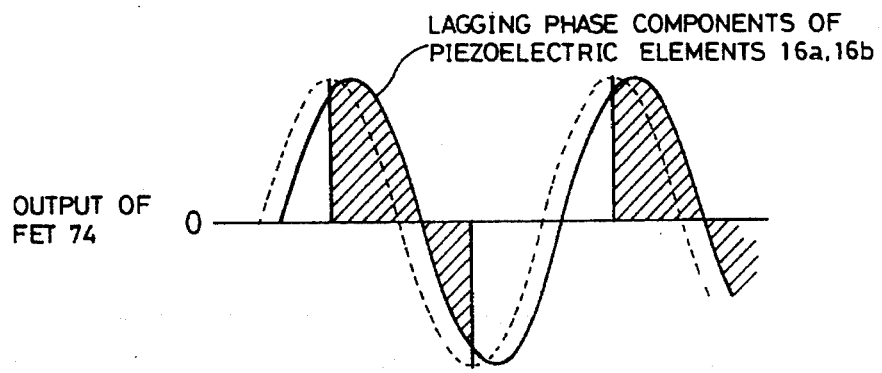
FIG. 8 is a wave form diagram showing an output signal of an FET connected to a summing circuit of the detecting circuit shown in FIG. 5.
Figure 9:
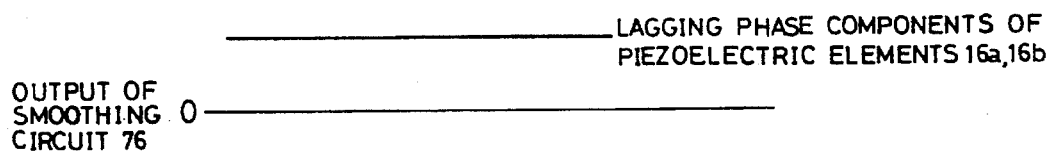
FIG. 9 is a wave form diagram smoothed the signal shown in FIG. 8.

On the other hand, as shown in FIG. 8, even if one of the drift signals of the piezoelectric elements 16a and 16b lags, the output signal from the amplifier 68 lags compared with a case not having a phase difference. When the output signal of the amplifier 68 is synchronously detected by the FET 74 and smoothed, as shown in FIG. 9, a positive signal is obtained. By composing the output signals of the two smoothing circuits 52 and 76 by the variable resistor 88, a phase component of a drift signal can be offset. When the output signal of the smoothing circuit 52 is a positive, the movable terminal of the variable resistor 88 is adjusted to the side of the inversion input terminal of the DC amplifier 86. Contrarily, when the output signal of the smoothing circuit 52 is a negative, the movable terminal of the variable resistor 88 is adjusted to the side of the non-inversion input terminal of the DC amplifier 86. For offsetting a phase component of a drift signal in this way, depending on a phase relation between the drift signals of the piezoelectric elements 16a and 16b, the variable resistor 88 as a composite means may be adjusted. In this way, in the detecting circuit 10 shown in FIG. 5, not only a level component but also a phase component of a drift signal can be eliminated.

Figure 10:
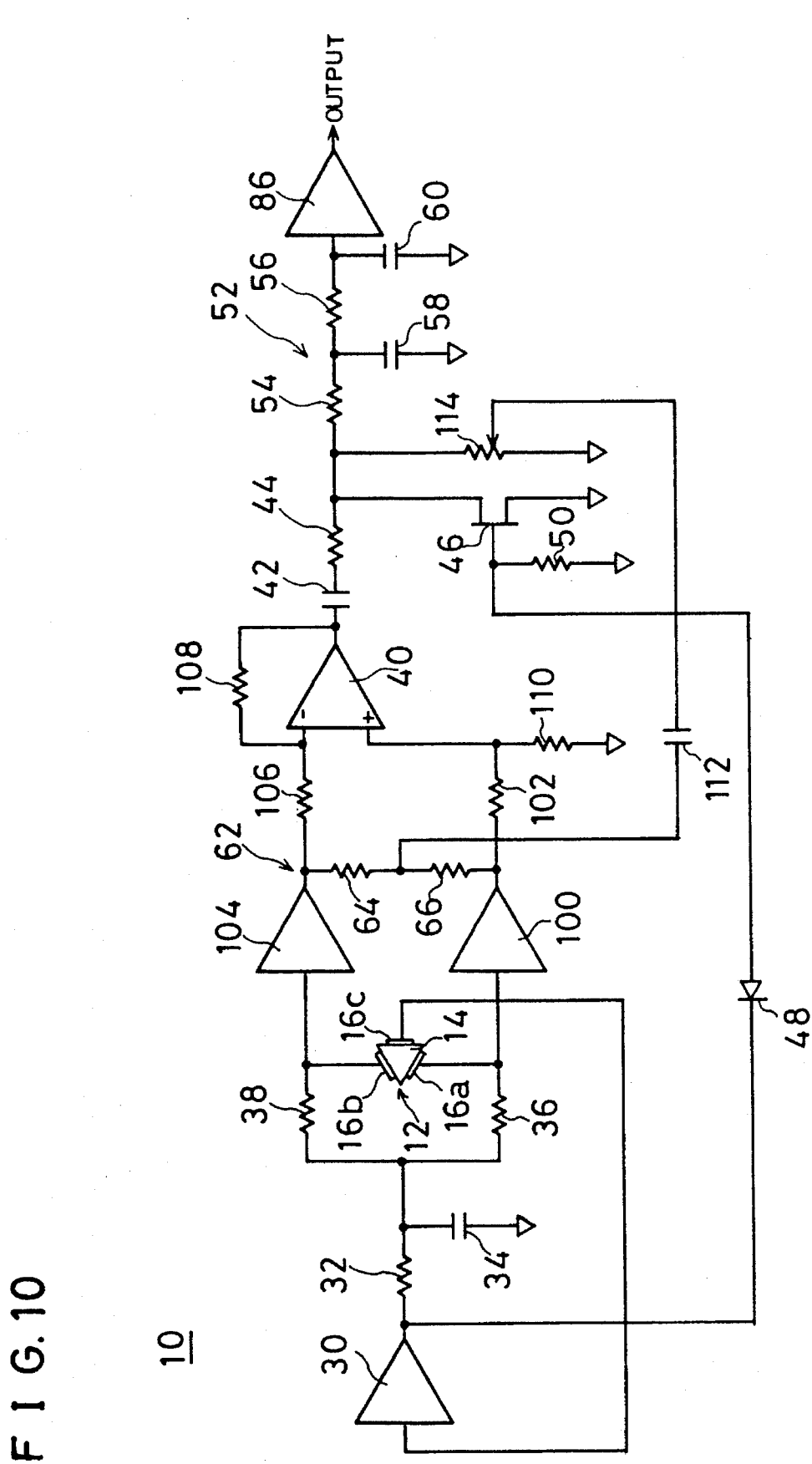
FIG. 10 is a circuit diagram showing still another embodiment of the present invention.

In the detecting circuit shown in FIG. 5, two synchronous detection circuits and two smoothing circuit are necessary, the circuit is complicated. A detecting circuit having one synchronous detection circuit and one smoothing circuit is shown in FIG. 10. In the detecting circuit 10, the piezoelectric element 16a is connected to the non-inversion input terminal of the differential circuit 40 via a buffer 100 and a resistor 102. The piezoelectric element 16b is connected to the inversion input terminal of the differential circuit 40 via a buffer 104 and a resistor 106. A resistor 108 is connected between the output terminal and the inversion input terminal of the differential circuit 40, the non-inversion input terminal of the differential circuit 40 is connected to the intermediate point of the power supply voltage via a resistor 110. The output terminal of the summing circuit 62 is connected to a movable terminal of a variable resistor 114 as a summing composite means via a capacitor 112. Two fixed terminals of the variable resistor 114 are connected to the source of the FET 46 and the intermediate point of the power supply voltage. In the detecting circuit 10, a composing signal of the output signal of the differential circuit 40 and the output signal of the summing circuit 62 is synchronously detected.

In the detecting circuit 10, since there is a phase difference of 90 degree between the driving signals applied to the piezoelectric elements 16a and 16b and the output signal of the oscillation circuit 30, a level component of a drift signal is synchronously detected by the FET 46, thereby the level component is offset. Though there is a case that a phase of a level component of a drift signal is converted by a difference between the levels of the drift signals of the piezoelectric elements 16a and 16b as shown in FIG. 11, the level component of the drift signal is offset even the case.

Figure 11:
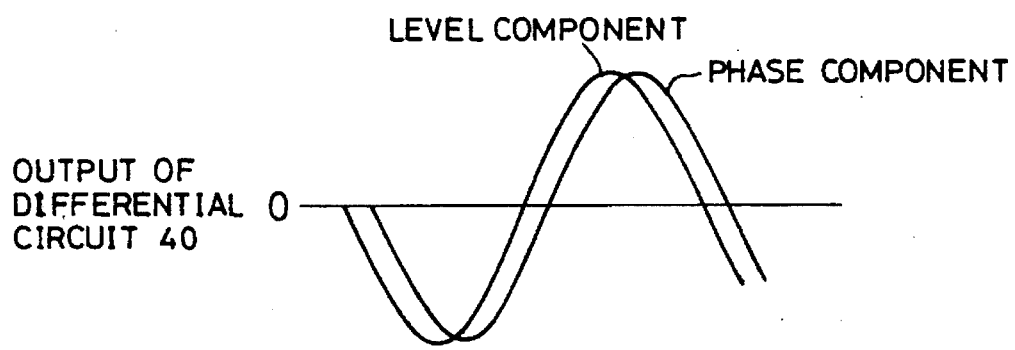
FIG. 11 is a wave form diagram showing an output signal of a differential circuit of the detecting circuit shown in FIG. 8.
Figure 12:
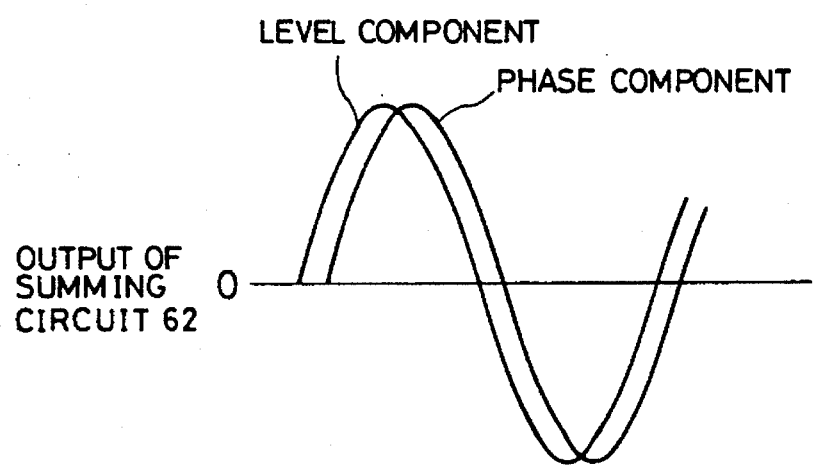
FIG. 12 is a wave form diagram showing an output signal of a summing circuit of the detecting circuit shown in FIG. 8.

Since the phase component of the drift signal of the output signal of the differential circuit 40 and the phase component of the drift signal of the output signal of the summing circuit 62 are opposite phases as shown in FIGS. 11 and 12, the phase components of drift signals can be offset by summing and composing. In this case, for eliminating the phase component of the drift signal obtained from the differential circuit 40 and the phase component of the drift signal obtained from the summing circuit 62, the variable resistor 114 is adjusted. When the output signals of the differential circuit 40 and the output signal of the summing circuit 62 are the same phase, the output signal of the summing circuit 62 is inverted and composed, thereby the phase components of the drift signals can be offset.

Figure 13:
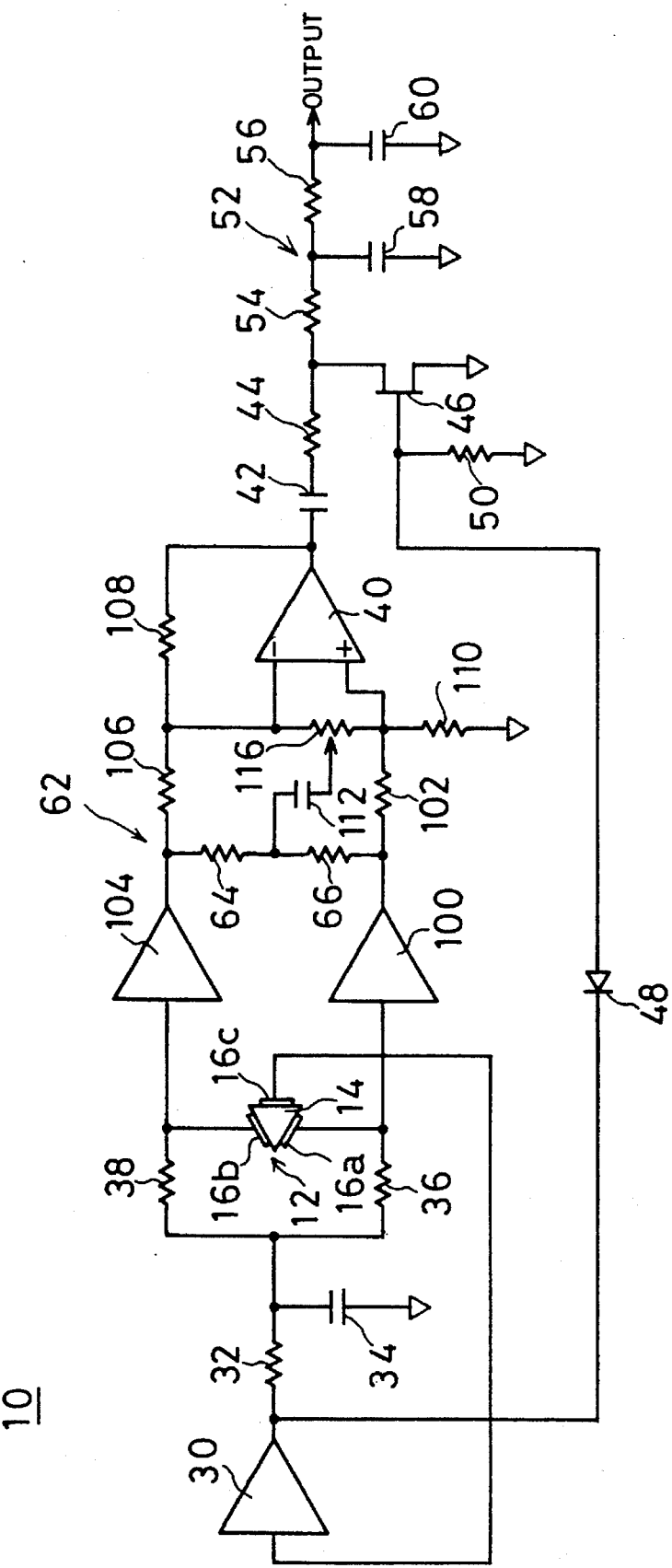
FIG. 13 is a circuit diagram showing a separate embodiment of the present invention.
Figure 14:
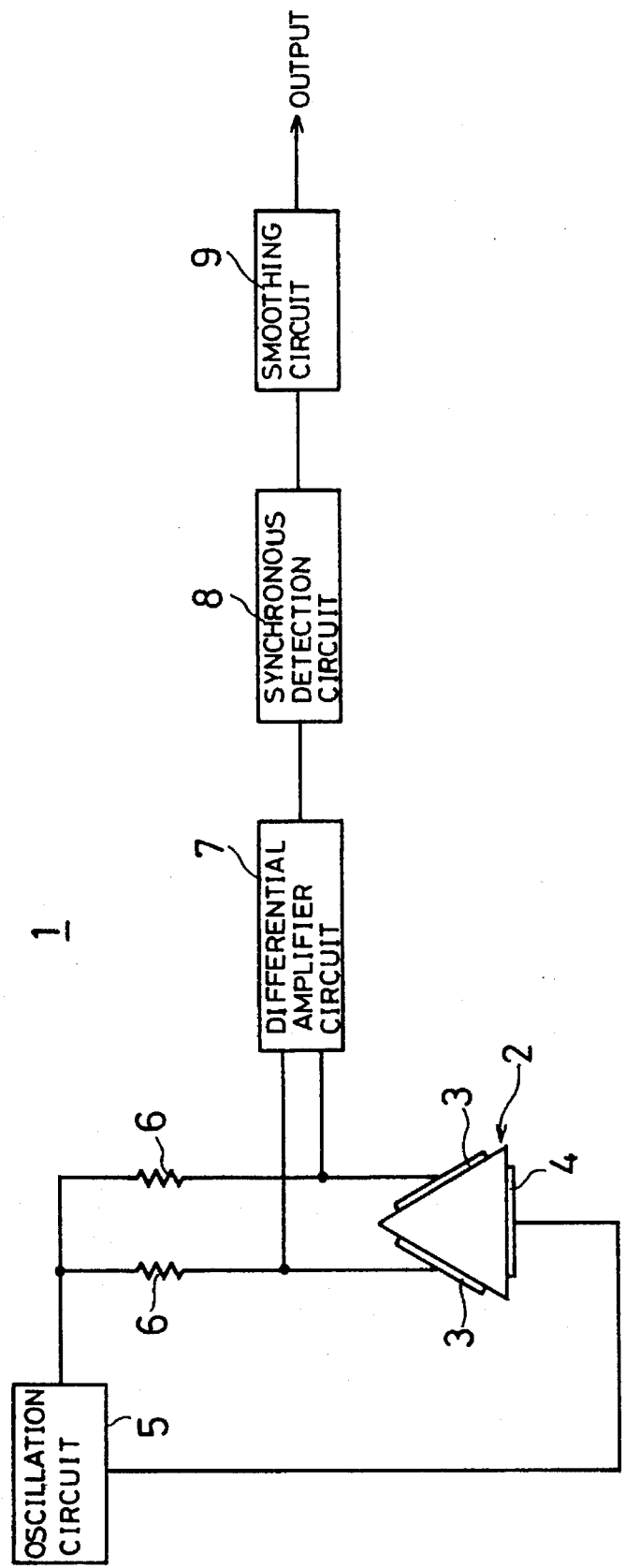
FIG. 14 is a block diagram showing an example of a conventional detecting circuit which is a background of the present invention.

In the detecting circuit 10 shown in FIG. 10, by a relation between the output signal of the differential circuit 40 and the output signal of the summing circuit 62, it is necessary to invert the output signal of the summing circuit 62, the circuit is complicated. Though it is shown in FIG. 11 that the difference between the drift signals of the piezoelectric elements 16a and 16b lags, when the difference between the drift signals leads, it is hardly to eliminate the phase components of the drift signals completely. A detecting circuit shown in FIG. 13 is considered.

In the detecting circuit 10, fixed terminals of a variable resistor 116 are connected to the two input terminals of the differential circuit 40. The output signal of the summing circuit 62 is applied to a movable terminal of the variable resistor 116. In the detecting circuit 10, since there is a phase difference of 90 degree between the driving signals applied to the piezoelectric elements 16a and 16b and the output signal of the oscillation circuit 30, the level components of the drift signals obtained from the differential circuit 40 and the summing circuit 62 are offset by synchronously detecting.

There is a case that the difference of the phase components of the drift signals leads or lags in the same as the case shown in FIG. 6. When the phase component of the drift signal is synchronously detected and smoothed, there is a case that it becomes a positive or a negative output signal in the same as the case shown in FIG. 7. The sum of the phase components of the drift signals always becomes a lagging signal in the same as the case shown in FIG. 8. When the the phase component of the drift signal is synchronously detected and smoothed, a positive signal is always obtained in the same as the case shown in FIG. 9.

When the phase component of the drift signal obtained from the differential circuit 40 is a lagging signal, since the output signal of the smoothing circuit 52 becomes a positive signal, the phase components of the drift signals of the piezoelectric elements 16a and 16b are offset by adjusting the movable terminal of the variable resistor 108 to the side of the inversion input terminal of the differential circuit 40. When the phase component of the drift signal obtained from the differential circuit 40 is a leading signal, since the output signal of the smoothing circuit 52 becomes a negative signal, the phase components of the drift signals obtained from the piezoelectric elements 16a and 16b are offset by adjusting the movable terminal of the variable resistor 108 to the side of the non-inversion input terminal of the differential circuit 40.

In this way, in the detecting circuit 10, even if the difference of the phase components of the drift signals is a leading signal or a lagging signal, it can be eliminated easily by adjusting the variable resistor. It is unnecessary to use a circuit for inverting the output signal of the summing circuit 62 and so on, the circuit constitution can be simplified.

Though it is described in the above each embodiment that the vibratory gyroscope wherein the piezoelectric elements are formed on the side faces of the vibrating body consisting of a metal material or the like, a detecting circuit according to the present invention can be applied to a vibratory gyroscope wherein electrodes are formed on a side face of a vibrating body consisting of a piezoelectric material.

It will be apparent from the foregoing that, while the present invention has been described in detail and illustrated, these are only particular illustrations and examples, and the present invention is not limited to these.

What is claimed is:

1. A detecting circuit for detecting an output of a vibratory gyroscope including a prism-shaped vibrating body and two driving and detecting members formed on a surface of said vibrating body used both for driving to vibrate said vibrating body and for detecting to obtain an output corresponding to a rotational angular velocity, said detecting circuit comprising:

a summing circuit for outputting a sum of output signals from said driving and detecting members;

a differential circuit for outputting a difference between said output signals from said driving and detecting members;

a first synchronous detection circuit for synchronously detecting an output signal of said differential circuit in synchronous with a synchronizing signal;

a second synchronous detection circuit for detecting an output signal of said summing circuit in synchronous with said synchronizing signal; and a composite circuit for composing an output signal of said first synchronous detection circuit and an output signal of said second synchronous detection circuit;

wherein a phase difference between a driving signal applied to said driving and detecting members and said synchronizing signal applied to said first and second synchronous detection circuits is 90 degree.

2. A detecting circuit according to claim 1, which further comprises:

two smoothing said circuit for smoothing output signals of said synchronous detection circuits.

3. A detecting circuit according to claim 1, wherein said synchronizing signal is an output signal of an oscillation circuit, and said driving signal is a signal in which a phase of the output signal of said oscillation circuit is shifted by 90 degree by a phase-shifting circuit.

* * * * *